United States Patent [19]

Waggoner

[11] 4,125,964
[45] Nov. 21, 1978

[54] EDGING DEVICE

[76] Inventor: Donald L. R. Waggoner, 13185 SW. Foothill Dr., Portland, Oreg. 97225

[21] Appl. No.: 788,777

[22] Filed: Apr. 19, 1977

[51] Int. Cl.² .................................................. A01G 1/08
[52] U.S. Cl. ............................................................ 47/33
[58] Field of Search .......................... 47/32, 33, 34; 404/2–5; 160/383, 392, 395, 397, 402, 403; 52/626, 601

[56] References Cited

U.S. PATENT DOCUMENTS

| 953,680 | 4/1910 | Baker | 160/392 |
|---|---|---|---|
| 1,276,887 | 8/1918 | Eckart | 47/32 X |
| 2,193,425 | 3/1940 | Lake | 47/33 |
| 3,916,563 | 11/1975 | Tedesh | 47/32 X |

FOREIGN PATENT DOCUMENTS

| 1,288,122 | 2/1962 | France | 160/403 |
|---|---|---|---|
| 215,529 | 5/1924 | United Kingdom | 47/33 |
| 1,366,637 | 9/1974 | United Kingdom | 160/397 |

Primary Examiner—Edgar S. Burr
Assistant Examiner—James R. Feyrer

[57] ABSTRACT

This device consists primarily of a plate having a right angle lip, with a beaded edge securing a rod therein, for interconnecting of several of the devices, and the beaded edge is shaped to form a U-shaped portion, which, together with the beaded edge, will retain a strip of wire mesh.

5 Claims, 4 Drawing Figures

U.S. Patent
Nov. 21, 1978
4,125,964
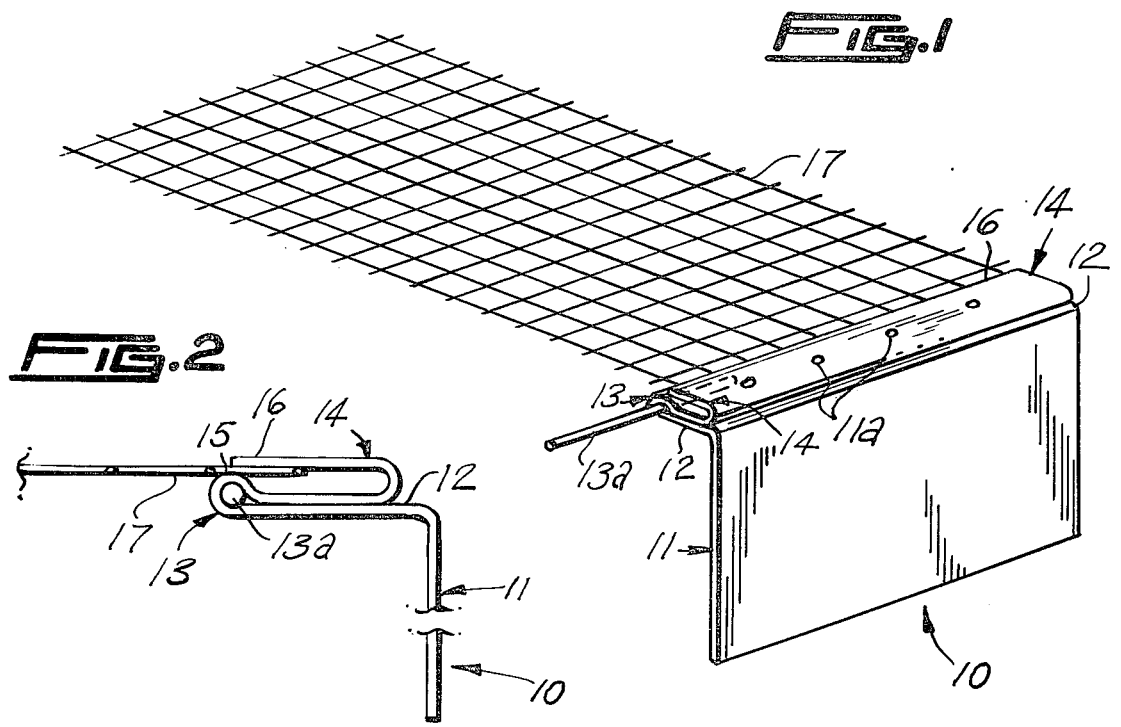
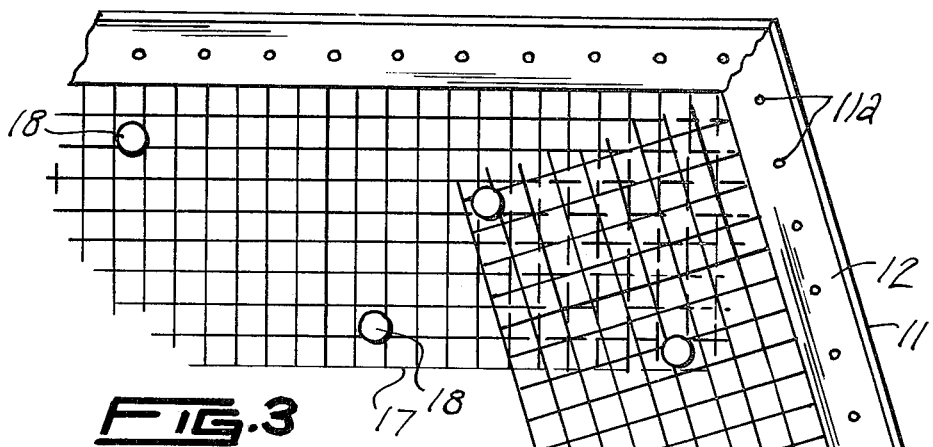
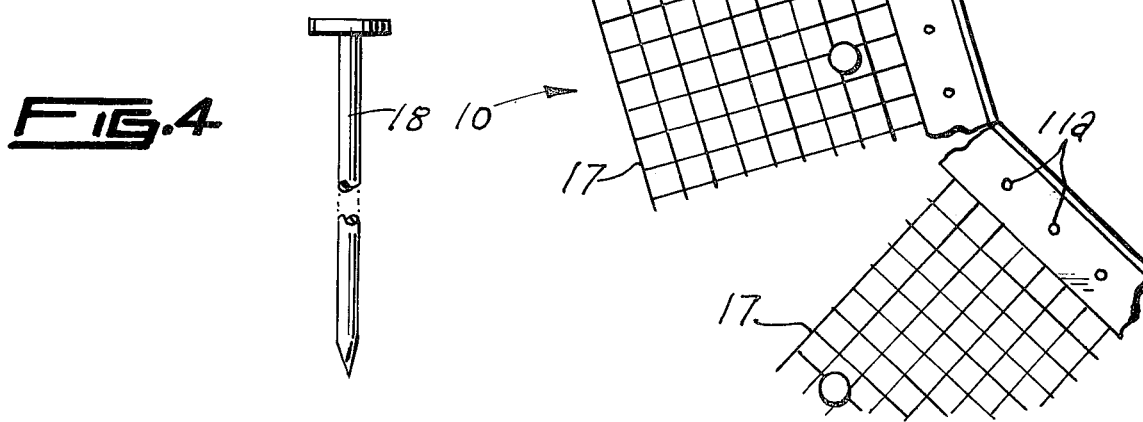

EDGING DEVICE

This invention relates to lawn-edging, and more particularly, to an improved edging device.

It is, therefore, the principal object of this invention to provide an edging device, which will serve as a permanent, firm and unobtrusive edging around areas where shrubs and bedding plants are used to separate the sod from the bedding area, and the device simultaneously serves as edging that is both permanent, and rigid, and will stay firmly in place without any appendages to hold it there.

Another object of this invention is to provide an edging device, of the type described, of which the only stay-in place attachments are large spikes, or staples, inserted through the webbing, to hold it in the desired shapes and places until the grass and sod grow through, to secure it firmly in position.

A further object of this invention is to provide an edging device, of the type described, which will eliminate the need of wide curbing, paving or planking, in order to maintain quick, nearly effortless, and easily manicured border-edging.

A still further object of this invention is to provide an edging device, of the type described, which, when the sod fills in through the wire mesh, or webbing, will form a smooth, flat horizontal plane, on which to operate either a hand or power edger, as well as forming a perpendicular edge over which the guide and blade will operate to form a straight-line cut of grass or lawn foliage, and will also enable the adjacent growing turf to be moved with a regular mower.

Other objects of this invention are to provide an edging device, which is simple in design, inexpensive to manufacture, rugged in construction, easy to use and efficient in use.

These, and other objects, will be readily evident, upon a study of the following specification, and the accompanying drawing, wherein:

FIG. 1 is a perspective view of the present invention;

FIG. 2 is an enlarged, fragmentary end view of FIG. 1;

FIG. 3 is a fragmentary plan view, showing how headed nails are used to secure the edging, until sod fills it through, thus securing it tightly; and FIG. 4 is an enlarged vertical view of one of the nail fasteners, shown in elevation.

According to this invention, an edging device 10 is shown to consist of a plate 11, of rectangular configuration having a lip 12, bent at right angles. Lip 12 is provided with a beaded edge 13, which receives rod 13a, which will be used to connect similar devices 10, together. Beaded edge 13 extends parallel with plate 11, and is bent into a U-shaped portion 14. The outer periphery 15 of the edge 13, and edge 16 of the U-shaped portion 14, serve to fixedly secure an edge of wire mesh 17 therein. Device 10 is provided with a plurality of equally spaced apart dimples 11a, so as to impart rigidity thereto.

Shown in FIG. 3 of the drawing, is the suggested method of cutting the interior cross-wise, and through the lip 12, at various intervals of distance, to permit bending or curving in either direction, to form the edging of curved or various shaped beds or areas of lawn cover, to be kept neatly within given bounds.

It shall be noted that a plurality of spaced apart, flat headed nails 18, are used to render devices 10 secure by being inserted through the wire mesh 17.

It shall further be noted, that the rod 13a, of device 10, is used to interconnect similar devices 10 with each other.

While various changes may be made in the detail construction, it is understood that such changes will be within the spirit and scope of the present invention, as is defined by the appended claims.

What I now claim is:

1. A lawn edging device, adapted for insertion into the soil at the edge of a lawn, comprising a vertical, bendable metallic plate in rectangular form, a horizontal lip formed at the top of said plate, said lip having a beaded edge which terminates as a U-shaped portion, said U-shaped portion providing securement means, a wire mesh horizontally secured in said securement means, said wire mesh having a size through which grass will grow, and rod means secured within said lip bead, said rod means providing interconnecting means for a plurality of substantially identical lawn edging devices.

2. The combination according to claim 1, wherein said lip of said plate is formed at right angles of said plate and said beaded edge of said lip is parallel with said plate and said rod means is fixedly secured within one end of said beaded edge of said lip.

3. The combination according to claim 2, wherein an extending portion of said beaded edge of said lip is U-shaped in configuration and parallel with said lip, said U-shaped portion having spaced apart dimples therein, for providing rigidity thereto.

4. The combination according to claim 3, wherein the terminating edge of said U-shaped portion of said device engages with one side of an edge of said wire mesh and the opposite side of said wire mesh engages with the outer periphery of said beaded edge of said lip, and said wire mesh is fixedly secured between said edge of said U-shaped portion and the outer periphery of said beaded edge.

5. The combination according to claim 4, wherein flat headed nail fasteners are spaced apart and received within said wire mesh, thus rendering said device secure to soil.

* * * * *